(No Model.)

T. P. TAYLOR.
CORSET.

No. 355,954. Patented Jan. 11, 1887.

Witnesses.
E. D. Smith
C. E. Ruggles

Inventor.
Thomas P. Taylor
By A. M. Wooster
Atty.

UNITED STATES PATENT OFFICE.

THOMAS P. TAYLOR, OF BRIDGEPORT, CONNECTICUT.

CORSET.

SPECIFICATION forming part of Letters Patent No. 355,954, dated January 11, 1887.

Application filed September 27, 1886. Serial No. 214,618. (No model.)

*To all whom it may concern:*

Be it known that I, THOMAS P. TAYLOR, a citizen of the United States, residing at Bridgeport, in the county of Fairfield and State of Connecticut, have invented certain new and useful Improvements in Corsets; and I do hereby declare the following to be a full, clear, and exact description of the invention, such as will enable others skilled in the art to which it appertains to make and use the same.

My invention relates to the manufacture of corsets, and has for its object to simplify and cheapen, and at the same time to improve the mode of lacing. In Letters Patent No. 347,449, dated August 17, 1886, the back stays of the corset are shown as provided with eyes which project inward from the edges thereof, the eyes being rigidly attached to the stays which lie in pockets at the back edges of the corset. In certain classes of corsets it is desirable to obtain greater flexibility than is possible where the lacing-eyes are rigidly attached to the stays. I have therefore devised a novel construction in which a series of independent lacing-eyes are placed in the edge of each corset-back and project outward therefrom, it being immaterial, for the purposes of my invention, whether the eyes are secured to the stays or to the material of the corset itself, the gist of the invention lying in using a series of eyes, each of which is securely held in place in the corset edge and is free to swing in the open space between the back sections.

Figure 5:
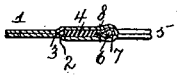
Figure 6:
Figure 7:

In the accompanying drawings, forming part of this specification, Figures 1 to 4, inclusive, are elevations illustrating different modes in which I have carried my invention into effect. Fig. 5 is a cross-section of the form illustrated in Fig. 1; Fig. 6, a cross-section of the form illustrated in Fig. 2; Fig. 7, a cross-section of the form illustrated in Fig. 3.

1 denotes the material of which the corset is made; 2, bone pockets formed by lines of stitching; 3 4, bone wires or stays in said pockets, and 5 the independent lacing-eyes. As already stated, these independent lacing-eyes may be held in place in various different ways.

Figure 1:
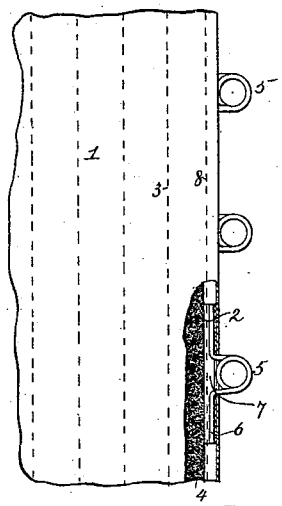

In Figs. 1 and 5 I have shown the eyes as formed of strips of wire, coiled once, in order that the bearing surface for the cord may be doubled, the ends 6 of the strips of wire being brought inward and then turned outward at right angles so that straight portions are formed which lie parallel with the edge of the stay.

7 denotes strips of leather or strong textile material, which are folded over the straight ends of the strips of wire, the eyes themselves being passed through openings in strips 7. In this form the eyes are secured in place by a line of stitching, 8, between the ends 6 of the eyes and the bone wire, said line of stitching passing through the material of the corset and through the strips, as clearly shown in Fig. 1. In the form illustrated in Figs. 2 and 6 the lacing-eyes are formed in the same manner as in Fig. 1, and are secured between the plies of a wide strip, 9. Openings are provided at the edge of this strip, through which the eyes project, and the plies of the strip are glued firmly together. This strip with the eyes in it is placed in the bone pocket, together with an ordinary stay or bone wire, as is clearly shown in Figs. 2 and 6, and a line of stitching, 8, is placed between the end 6 of the eyes and the bone wire, as in Fig. 1. In the form illustrated in Figs. 3 and 7 the eyes are made in the same manner as in Figs. 1 and 2, and are secured in place by strips 11, wrapped about the stay itself. These strips may be made of metal, textile material, or leather. When made of textile material, they are preferably glued to the stay.

Figure 2:
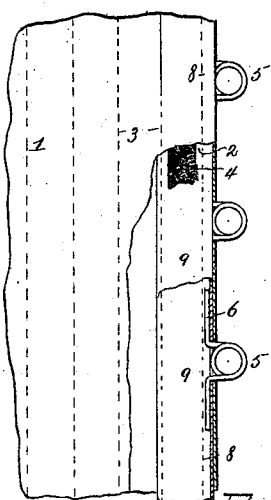
Figure 3:
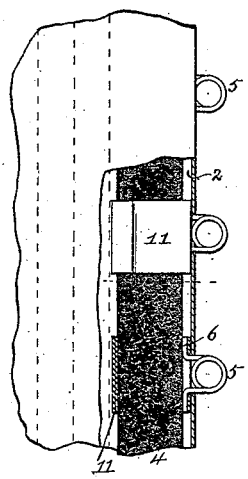
Figure 4:
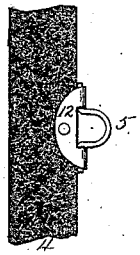

In Fig. 4 the eye is shown as formed from a single strand of wire, the ends being left straight, as in Figs. 1, 2, and 3, and being held in place by a shield, 12, which is riveted directly to the stay.

Having thus described my invention, I claim—

1. The combination, with the back sections of a corset and back stays stitched within said sections, of independent lacing-eyes having outwardly-turned straight ends 6, also secured within the edges of said sections, so that the eyes project outward beyond the edges thereof and are free to swing in the open space between said sections to give greater flexibility at the back of the corset.

2. The combination, with the back sections of a corset and back stays stitched within said sections, of independent lacing-eyes at the outer edges of the stays, having outwardly-turned straight ends 6, and means—for example, strips or loops engaging ends 6—whereby said lacing-eyes are secured in place in the edges of the corset, but remain free to swing in the open space between the sections, as and for the purpose set forth.

3. The combination, with the back sections of a corset and back stays stitched therein, of independent lacing-eyes which project outward beyond the edges of the sections, are provided with outwardly-turned straight ends 6, and are made double at the portion forming the bearing-surface for the lacing-cord, and means—for example, a loop or strip secured to the stay—whereby said eyes are secured in place in the edges of the corset, but remain free to swing, substantially as described.

In testimony whereof I affix my signature in presence of two witnesses.

THOMAS P. TAYLOR.

Witnesses:
A. M. WOOSTER,
C. E. RUGGLES.